S. RINGER.
HANDLE AND METHOD OF MAKING SAME.
APPLICATION FILED JUNE 25, 1920.

1,418,095. Patented May 30, 1922.

WITNESS:
L. Simons

INVENTOR.
Loren Ringer
BY H. G. Rockwell
ATTORNEY.

UNITED STATES PATENT OFFICE.

SOREN RINGER, OF CHICAGO, ILLINOIS.

HANDLE AND METHOD OF MAKING SAME.

1,418,095.

Specification of Letters Patent. Patented May 30, 1922.

Application filed June 25, 1920. Serial No. 391,845.

*To all whom it may concern:*

Be it known that I, SOREN RINGER, a subject of the King of Denmark, residing at Chicago, in the county of Cook and State of Illinois, have invented certain new and useful Improvements in a Handle and Method of Making Same, of which the following is a specification.

This invention relates in general to handles, and more particularly to handles adapted for use on filing cabinets, drawers, and the like.

One of the primary objects of this invention is to provide a handle which will be substantial and durable, one which will present a grip which can be grasped by the entire hand, and one which can be easily and economically manufactured and readily attached.

Other objects and advantages of my invention will be apparent to those skilled in the art as the same becomes better understood, by reference to the following description when considered in connection with the accompanying drawings.

Referring to the drawings.

Figure 1:
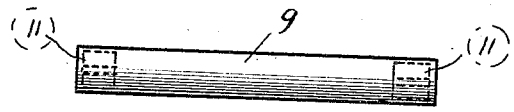
Fig. 1 is a plan view of a tube from which my improved handle is shaped.
Figure 2:
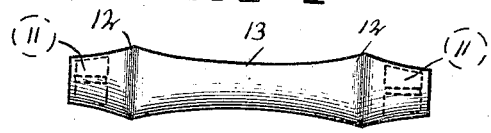
Fig. 2 is a similar view showing the shape of the tube after the flattening operation.

In making a handle in accordance with my invention, a tube, designated generally by reference character 9, of suitable length to provide a handle of the required dimensions is first plugged at each end by inserting snugly fitting wooden plugs 11. The tube is next compressed or flattened adjacent the inner ends of the plugs, as indicated by reference character 12. This flattening operation serves to compress the plugs, which are preferably of soft wood, in one direction, and to expand them laterally so that they are thereby locked in the tube, as best shown in Fig. 2. The distortion or flattening of the inner ends of the plugs occasioned by flattening the tube in proximity to the plugs anchors the plugs in the tube so that they will not be withdrawn from the tubes when the handle is in use.

Figure 3:
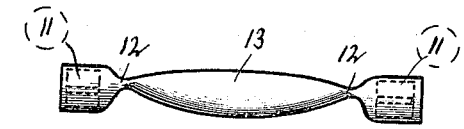
Fig. 3 is an edge view of the structure shown in Fig. 2.
Figure 4:
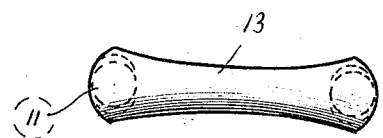
Fig. 4 is a front view of a completed handle.

That portion of the tube between the flattened portions 12 becomes the grip of the handle, this portion being designated by reference character 13, and its shape at the completion of the flattening operation being best shown in Figs. 2 and 3.

Figure 5:
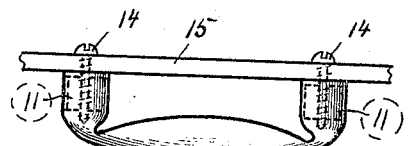
Fig. 5 is a side view of the handle, showing the method of attachment.
Figure 6:
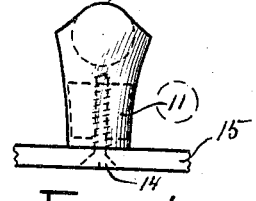
Fig. 6 is an end view of the handle shown in Fig. 5.

The tube is next bent at the flattened portions to dispose the plugged ends at an angle to the longitudinal axis of the tube, and this bending is preferably continued to a point where the plugged ends are disposed in substantially parallel relation, as will be evident from Fig. 5. The handle is now completed and ready for attachment to a filing case, drawer, or other place where the same may be used.

The handle is attached by screws 14 extending outwardly through the front wall 15 of the drawer or case, to which the handle is applied, and screwed to the plugs 11 of the handle, which plugs may if preferred, have been previously drilled to facilitate the entrance of the screws.

Figure 7:
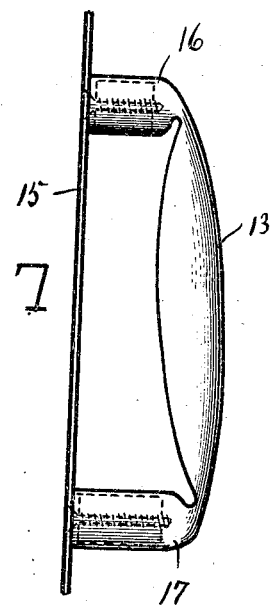
Fig. 7 is a side view of a modified form of handle.
Figure 8:
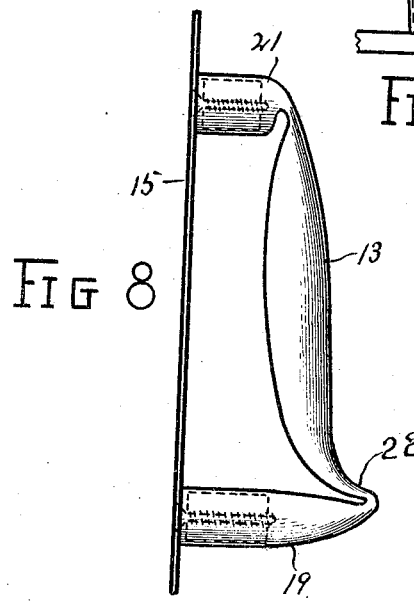
Fig. 8 is a similar view of still another form.

By this method of manufacture, handles of various shapes and sizes may be produced. In the handle shown in Fig. 5, the plugged ends are of substantially the same length, while in that shown in Fig. 7, the upper end 16 is considerably shorter than the lower end 17. In the form shown in Fig. 8, the lower end 19 is considerably longer than the upper end 21, and the flattening between the end 19 and the grip portion 13 is prolonged, and the bend in this flattened portion is accentuated to provide a hand rest 22 at the lower end of the handle which facilitates the handling of heavy drawers. The forms shown convey an idea of a few of the many shapes in which my invention may be embodied. While I have shown and described those forms, which at present appear preferable, it should be understood that considerable modification in the structure of the handle and in the method of manufacture, may be resorted to without departing from the essence of the invention, as defined in the following claims.

I claim:

1. A handle, comprising a continuous tubular member having its ends bent to project in parallelism and at right angles to the plane of the face of the object to which the handle is adapted to be attached, and a wooden plug in each tubular end, the member being bent adjacent the inner end of each plug to hold the plug in position.

2. A handle, comprising a continuous tube bent into handle shape, and plugs disposed in the ends thereof.

3. A handle, comprising a tube, and a plug in each end thereof, said tube being flattened adjacent the inner end of the plugs and bent to dispose said plugged ends in substantially parallel relation.

4. A handle comprising a tubular member, and plugs disposed in the ends of said member, said member being compressed to retain said plugs in position, and bent so that said plugged ends project laterally from the body of the handle, with the axes of said plugs perpendicular to the plane of the face of the object to which the handle is adapted to be applied.

5. The method of making handles, which consists of inserting a plug in each end of a tubular member, flattening said member adjacent the inner end of each plug and bending said member at the flattened portions to dispose said plugged ends in laterally projecting position.

6. The method of making handles, which consists of inserting a plug in each end of a tubular member, securing the plugs therein by compressing the tube, and bending the tube to dispose said plugged ends at an angle to the longitudinal axis of said tube.

SOREN RINGER.